US010680428B2

(12) United States Patent
Geissler et al.

(10) Patent No.: US 10,680,428 B2
(45) Date of Patent: Jun. 9, 2020

(54) ENERGY SUPPLY

(71) Applicant: Siemens Aktiengesellschaft, Munich (DE)

(72) Inventors: Michael Geissler, Berlin (DE); Michael Stehle, Postbauer-Heng (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 400 days.

(21) Appl. No.: 15/686,516

(22) Filed: Aug. 25, 2017

(65) Prior Publication Data

US 2018/0076611 A1    Mar. 15, 2018

(30) Foreign Application Priority Data

Sep. 13, 2016   (DE) .......................... 10 2016 217 425

(51) Int. Cl.
| | |
|---|---|
| *H02H 1/06* | (2006.01) |
| *H02H 9/04* | (2006.01) |
| *H02H 1/00* | (2006.01) |
| *H02H 3/02* | (2006.01) |
| *H02H 3/08* | (2006.01) |
| *H02H 9/02* | (2006.01) |

(52) U.S. Cl.
CPC ............ *H02H 1/06* (2013.01); *H02H 1/0007* (2013.01); *H02H 3/025* (2013.01); *H02H 3/083* (2013.01); *H02H 9/02* (2013.01); *H02H 9/041* (2013.01)

(58) Field of Classification Search
CPC ........ H02H 1/0007; H02H 1/06; H02H 3/025; H02H 3/083; H02H 9/02; H02H 9/041

USPC ....................................................... 361/93.9
See application file for complete search history.

(56) References Cited

U.S. PATENT DOCUMENTS

| | | | |
|---|---|---|---|
| 3,582,982 A | 6/1971 | Swinehart et al. | |
| 3,794,889 A * | 2/1974 | Clausing ................ | H02H 3/021 361/87 |
| 3,878,434 A * | 4/1975 | Voorhoeve ............. | H02H 9/008 361/55 |
| 4,390,832 A * | 6/1983 | Taylor .................... | B29C 65/04 323/273 |

(Continued)

FOREIGN PATENT DOCUMENTS

| | | |
|---|---|---|
| CA | 1281768 C | 3/1991 |
| CN | 87106171 A | 5/1988 |

(Continued)

OTHER PUBLICATIONS

Chinese Office Action and English translation thereof dated Jul. 2, 2019.

(Continued)

*Primary Examiner* — Kevin J Comber
(74) *Attorney, Agent, or Firm* — Harness, Dickey & Pierce, P.L.C.

(57) ABSTRACT

An energy supply for an electrical circuit breaker includes a current converter with a primary conductor and a secondary winding. The energy supply further has a triac with two main connections and one control connection, the triac being connected electrically in parallel with the secondary winding via the main connections. A series circuit including at least two zener diodes is connected to the control connection of the triac at one end and to a main connection of the triac at the other end.

17 Claims, 5 Drawing Sheets

(56) References Cited

U.S. PATENT DOCUMENTS

| | | | | | |
|---|---|---|---|---|---|
| 4,878,010 | A | * | 10/1989 | Weber | H02M 5/257 |
| | | | | | 323/300 |
| 6,018,700 | A | * | 1/2000 | Edel | G01R 19/2513 |
| | | | | | 361/18 |
| 2003/0112572 | A1 | | 6/2003 | Knigge et al. | |
| 2004/0257742 | A1 | | 12/2004 | Zeller et al. | |
| 2004/0263109 | A1 | * | 12/2004 | Schwarz | H02P 1/44 |
| | | | | | 318/778 |

FOREIGN PATENT DOCUMENTS

| | | |
|---|---|---|
| CN | 2273049 Y | 1/1998 |
| CN | 2281599 Y | 5/1998 |
| CN | 201813138 U | 4/2011 |
| CN | 103427674 A | 12/2013 |
| DE | 2451099 A1 | 5/1976 |
| DE | 2952791 A1 | 7/1980 |
| DE | 19845779 A1 | 3/2000 |
| DE | 10221030 A1 | 11/2003 |
| EP | 1304786 A1 | 4/2003 |
| FR | 2699016 A1 | 6/1994 |
| WO | WO 9943010 A2 | 8/1999 |

OTHER PUBLICATIONS

German Office Action #102016217425.8 dated May 3, 2017.
Chinese Office Action and English translation thereof dated Oct. 29, 2018.

* cited by examiner

ENERGY SUPPLY

PRIORITY STATEMENT

The present application hereby claims priority under 35 U.S.C. § 119 to German patent application number DE 102016217425.8 filed Sep. 13, 2016, the entire contents of which are hereby incorporated herein by reference.

FIELD

At least one embodiment of the invention generally relates to an energy supply for a circuit breaker, in particular comprising a current converter which has a secondary winding for the energy supply of the circuit breaker and the primary side of which is formed by a conductor of the circuit breaker. This primary conductor is a conductor of an electrical circuit, in particular a low-voltage electrical circuit, which is to be monitored by the circuit breaker.

At least one embodiment of the invention further generally relates to a DC voltage current limiting device for an electrical circuit breaker.

BACKGROUND

Low voltage means electrical voltages of up to 1000 volts AC or 1500 volts DC.

Circuit breakers monitor the current flowing through them by way of a conductor and interrupt the electric current or energy flow to an energy sink or a load, this being called tripping, when current limit values or current/time period limit values, that is to say when a current value lasts for a certain time period, are exceeded. Interruption is performed, for example, by contacts of the circuit breaker which are opened.

Within the meaning of embodiments of the invention, circuit breaker means, in particular, switches as are used in low-voltage installations for currents of from 63 to 6300 amperes. Molded case circuit breakers are especially used for currents of from 63 to 1600 amperes, in particular of from 125 to 630 or 1200 amperes. Air circuit breakers are used, in particular, for currents of from 630 to 6300 amperes, especially of from 1200 to 6300 amperes.

Air circuit breakers are termed ACB for short, and molded case circuit breakers are termed MCCB for short.

Within the meaning of embodiments of the invention, circuit breaker means, in particular, circuit breakers with an electronic trip unit, ETU for short. Energy supply of the circuit breaker means, in particular, the energy supply of the electronic trip unit.

Using current converters, a power can be magnetically output from an alternating current flowing in a primary conductor to a surrounding secondary winding. Current converters are a form of transformer. One problem with current converters is the fact that the apparent power of this current converter is determined by the current level in the primary conductor. The power which is output on the secondary side is dependent on the current in the primary conductor. If a connected load, such as an electronics system for example, e.g. an electronic trip unit of a circuit breaker, is intended to be supplied with energy, the energy requirement of the load and the minimum expected primary current are determined by the dimensioning of the current converter (magnetic material, core cross section, number of turns etc.).

A sufficient amount of energy for the load is emitted above the minimum expected primary current.

One specific property of circuit breakers is that they are intended to protect against overload and short-circuit currents in the monitored electrical circuit or supply system. Therefore, a very large primary current range has to be assumed when designing the current converter. The ratio between the expected minimum primary current and the maximum short-circuit current can be more than 1:1000.

As a result, the current converter and the connected load have to be specially dimensioned.

The use of current converters with an additional magnetic shunt, which limits the level of the secondary current and therefore the secondary power, is common. The development and the manufacture of converters of this kind require considerable expenditure in respect of time and costs. Furthermore, a current converter of this kind requires a relatively large installation space since, in addition to the magnetic main circuit, an additional second magnetic circuit in the form of a magnetic shunt has to be provided.

Since the apparent power of the current converter nevertheless increases as the primary current increases, this increase in power has to be dealt with on the load side.

To this end, the current flow in the secondary circuit was further previously interrupted by a switch. However, very high and dangerous induced voltages are dropped across the secondary winding in this case, it being possible to technically manage The voltages only with difficulty.

SUMMARY

At least one embodiment of the present invention improves the energy supply of circuit breakers with current converters. At least one embodiment of the present invention is directed to an energy supply and at least one embodiment of the present invention is directed to a DC voltage current limiting device.

At least one embodiment of the invention is directed to an energy supply for an electrical circuit breaker, comprising:

a current converter with a primary conductor and a secondary winding;

a triac including two main connections and one control connection, the triac being connected electrically in parallel with the secondary winding via the main connections; and a series circuit comprising at least two zener diodes, the series circuit being connected to the control connection of the triac at one end and to a main connection of the triac at the other end.

In one advantageous refinement of at least one embodiment of the invention for a DC voltage current limiting device, a series circuit comprising a first diode and a third capacitor is electrically connected between the positive pole and the negative pole, wherein the anode of the first diode is connected to the positive pole or the cathode of the first diode is connected to the negative pole, and the energy supply of the circuit breaker is provided by the voltage across the third capacitor.

BRIEF DESCRIPTION OF THE DRAWINGS

The described properties, features and advantages of embodiments of the invention and the manner in which they are achieved will become clearer and more distinctly comprehensible in conjunction with the following description of the example embodiments which are explained in more detail in conjunction with the drawings, in which.

DETAILED DESCRIPTION OF THE EXAMPLE EMBODIMENTS

Figure 1:
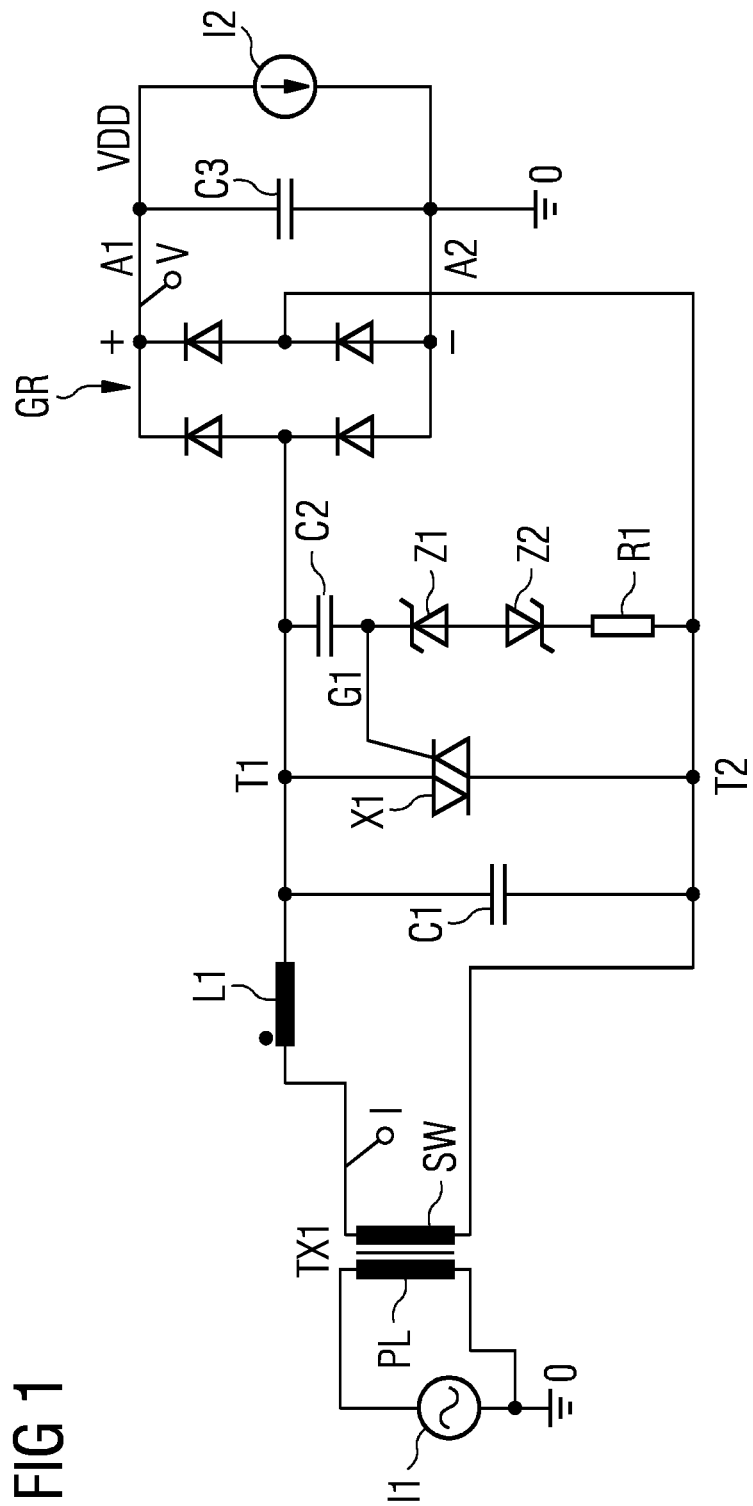
FIG. 1 shows a first circuit according to an embodiment of the invention of an energy supply.

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to at least one embodiment of the invention, it is provided that, particularly in the case of current converters of circuit breakers, the secondary-side AC voltage is limited by a triac, in the case of a DC voltage by a thyristor.

In this case, the triac is activated according to at least one embodiment of the invention by a series circuit comprising two zener diodes, in particular a series circuit in which the cathodes or anodes of the two zener diodes are connected to one another. If the definable zener voltage of the zener diode is exceeded, the triac is triggered and therefore the AC voltage is limited.

A thyristor is used in the case of a DC voltage, for example the rectified voltage of the current converter. The control connection or gate of The thyristor is connected to a zener diode. If the DC voltage exceeds the definable zener voltage, the thyristor is triggered and the DC voltage is limited.

This has the particular advantage that the secondary power is limited in a simple and effective manner in the case of large primary currents, as a result of which a load, such as an electronic trip unit of a circuit breaker, is effectively protected.

Advantageous refinements of embodiments of the invention are indicated in the claims.

In one advantageous refinement of at least one embodiment of the invention, a first capacitor is connected in parallel with the two main connections of the triac.

This has the particular advantage that high-frequency signals which could be caused by the triggering of the triac are reduced by the capacitor, as a result of which a better EMC response can be realized.

In one advantageous refinement of at least one embodiment of the invention, the parallel circuit comprising the secondary winding and the triac has an inductor.

This has the particular advantage that there is likewise a reduction in high frequency signals in respect of feedback and feeding into the energy supply system monitored by the circuit breaker and the high-frequency signals from the supply system do not reach the load.

In one advantageous refinement of at least one embodiment of the invention, the series circuit comprising at least two zener diodes has a first resistor.

This has the particular advantage that current limiting of the switch-on current of the triac is provided. Therefore, various triacs or/and zener diodes can be used for realization, wherein the switch-on current can be individually adjusted by the first resistor.

In one advantageous refinement of at least one embodiment of the invention, the control connection-side or gate-side connection of the series circuit is connected to a second capacitor which, at the other end, is connected to the main connection of the triac that is not connected to the series circuit.

This has the particular advantage that a further reduction in high-frequency signal components is realized, in order to achieve a better response of at least one embodiment of the invention in respect of EMC.

In one advantageous refinement of at least one embodiment of the invention, the two main connections of the triac are connected to the input connections of a rectifier, the two DC voltage-side output connections of The rectifier being connected to a third capacitor.

This has the particular advantage that a capacitor is cyclically charged, owing to the dimensioning of the triggering voltage of the triac, to a definable voltage which can be used for the energy supply of a load, such as the electronic trip unit of a circuit breaker. Therefore, a particularly stable energy supply can be provided.

In an advantageous refinement of at least one embodiment of the invention, the circuit breaker is designed for a three-phase energy supply system. One current converter and one triac are provided for each phase, the rectifier is configured as a three-phase rectifier, with three inputs, wherein the main connections of the triac of each phase are connected to the respective input of the three-phase rectifier.

This has the particular advantage that an energy supply according to at least one embodiment of the invention for a three-phase circuit breaker is provided.

In one advantageous refinement of at least one embodiment of the invention for a DC voltage current limiting device, a second resistor is connected in series with the zener diode.

This has the particular advantage that current limiting of the switch-on current of the thyristor is provided. Therefore, various thyristors or/and zener diodes can be used for realization, wherein the switch-on current can be individually adjusted by the second resistor.

In one advantageous refinement of at least one embodiment of the invention for a DC voltage current limiting device, a fourth capacitor is connected between the gate connection of the thyristor and the negative pole.

This has the particular advantage that a reduction in high-frequency signal components is realized, in order to achieve a better response of at least one embodiment of the invention in respect of EMC.

In one advantageous refinement of at least one embodiment of the invention for a DC voltage current limiting device, a fifth capacitor is connected to the cathode-side connection of the thyristor at one end and to the anode-side connection of the thyristor at the other end.

This has the particular advantage that high-frequency signals which could be caused by the triggering of the thyristor are reduced by the capacitor, as a result of which a better EMC response can be realized.

In one advantageous refinement of at least one embodiment of the invention for a DC voltage current limiting device, a series circuit comprising a first diode and a third capacitor is electrically connected between the positive pole and the negative pole, wherein the anode of the first diode is connected to the positive pole or the cathode of the first diode is connected to the negative pole, and the energy supply of the circuit breaker is provided by the voltage across the third capacitor.

This has the particular advantage that the third capacitor is cyclically charged, owing to the dimensioning of the triggering voltage of the thyristor, to a definable voltage which can be used for the energy supply of a load, such as the electronic trip unit of a circuit breaker. Therefore, a particularly stable energy supply can be provided. Furthermore, the diode prevents discharging of the third capacitor through the circuit according to the invention/the thyristor or the zener diode section.

In one advantageous refinement of at least one embodiment of the invention for a DC voltage current limiting device, the DC voltage conductor pair is connected to the output of a rectifier which is connected, at the input end, to the secondary winding of a current converter of the circuit breaker.

This has the particular advantage that the invention can be used for rectified voltages of the current converter of a circuit breaker.

All of the refinements, both in dependent form referring back to the claims and referring back only to individual features or combinations of features of patent claims, bring about an improvement in an energy supply for a circuit breaker.

FIG. 1 shows a first electrical circuit of an energy supply for an electrical circuit breaker. A current converter TX1 has, on the primary side, a primary conductor PL which is part of an electrical circuit which is monitored by a circuit breaker, not illustrated, and has an energy source I1. The current converter has, on the secondary side, a secondary winding SW which can have two or more connections. A triac X1, which usually has two main connections T1, T2 and one control connection G1, also called gate connection, is connected to two connections of the secondary winding SW. The two main connections T1, T2 are connected in parallel with the two connections of the secondary winding SW, that is to say main connection T1 is connected to one connection of the secondary winding, and main connection T2 is connected to the other connection of the secondary winding.

In principle, a parallel or series circuit means that further electrical components, such as resistors, capacitors, inductors, diodes, transistors, thyristors, triacs etc., can also be located in or on the electrical circuit. These can form further advantageous refinements.

By way of example, the parallel circuit comprising the secondary winding SW and the triac X1 has an inductor L1 which is connected, for example, between the main connection T1 and the connection of the secondary winding. This brings about damping of high frequencies as can be caused by the switching response of the triac, for example, and can have been generated in the electrical circuit of the energy source I1. It is important that the two main connections of the triac X1 are connected in parallel with the connections of the secondary winding SW.

Therefore, a second inductor or resistor, not illustrated, can for example be connected between the second main connection T2 of the triac X1 and the corresponding connection of the secondary winding SW.

Furthermore, a first capacitor C1 can for example be connected between the two main connections T1, T2 of the triac X1, as illustrated in FIG. 1. A reduction in high frequencies or high-frequency signal components can be achieved with this parallel circuit, as a result of which an improved EMC response can be realized.

According to FIG. 1, a series circuit comprising two zener diodes Z1, Z2 is connected to the control connection G1 of the triac X1, The series circuit in turn being connected to the second main connection T2 of the triac X1. As an alternative, The series circuit can also be connected to the first main connection T1 of the triac X1.

The series circuit comprising the zener diodes Z1, Z2 is designed in such a way that either the two anodes of the zener diodes Z1, Z2 are connected to one another, as illustrated in FIG. 1, or the two cathodes of the zener diodes Z1, Z2 are connected to one another.

The series circuit can have further components, as already mentioned in principle. In FIG. 1, the series circuit comprising the zener diodes Z1, Z2 has a first resistor R1. The resistor can be located both at the control connection-side end of the series circuit, between the two zener diodes, and, as illustrated, at the main connection-side end of the series circuit.

Furthermore, a second capacitor C2 can be connected between the control connection G1 of the triac and the main connection that is not connected to the series circuit comprising the zener diodes Z1, Z2, to the first main connection T1 in the example according to FIG. 1.

The two main connections T1, T2 are connected to the input of a rectifier GR. The rectifier can be formed, for example, by a bridge circuit or Graetz circuit, as illustrated in FIG. 1. The outputs A1, A2 of the rectifier G1 are connected to one another via a third capacitor C3. A load 12, such as the electronic trip unit of a circuit breaker, can be connected in parallel with the third capacitor C3 in order to provide the energy supply for an electrical circuit breaker.

Figure 2:
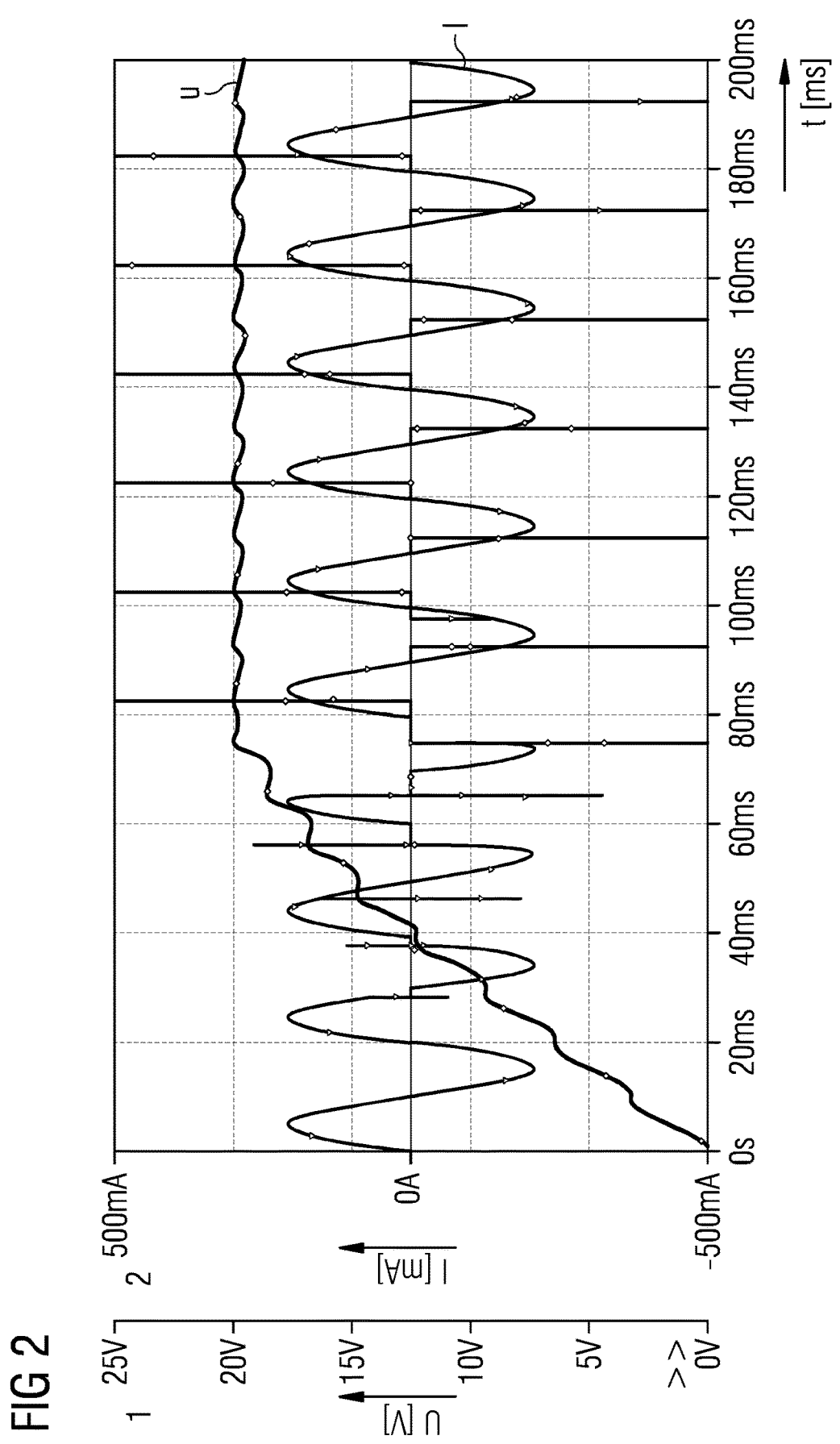
FIG. 2 shows a voltage/current timing diagram.

FIG. 2 shows an illustration of a voltage/circuit timing diagram. Time t in milliseconds ms is plotted on the horizontal X-axis. The approximately sinusoidal total current I in milliamperes mA in the third capacitor C3 and the load 12 and also the current through the triac X1 are plotted on the vertical Y-axis. The voltage U in volts across the capacitor C3 is also plotted on The Y-axis.

Figure 3:
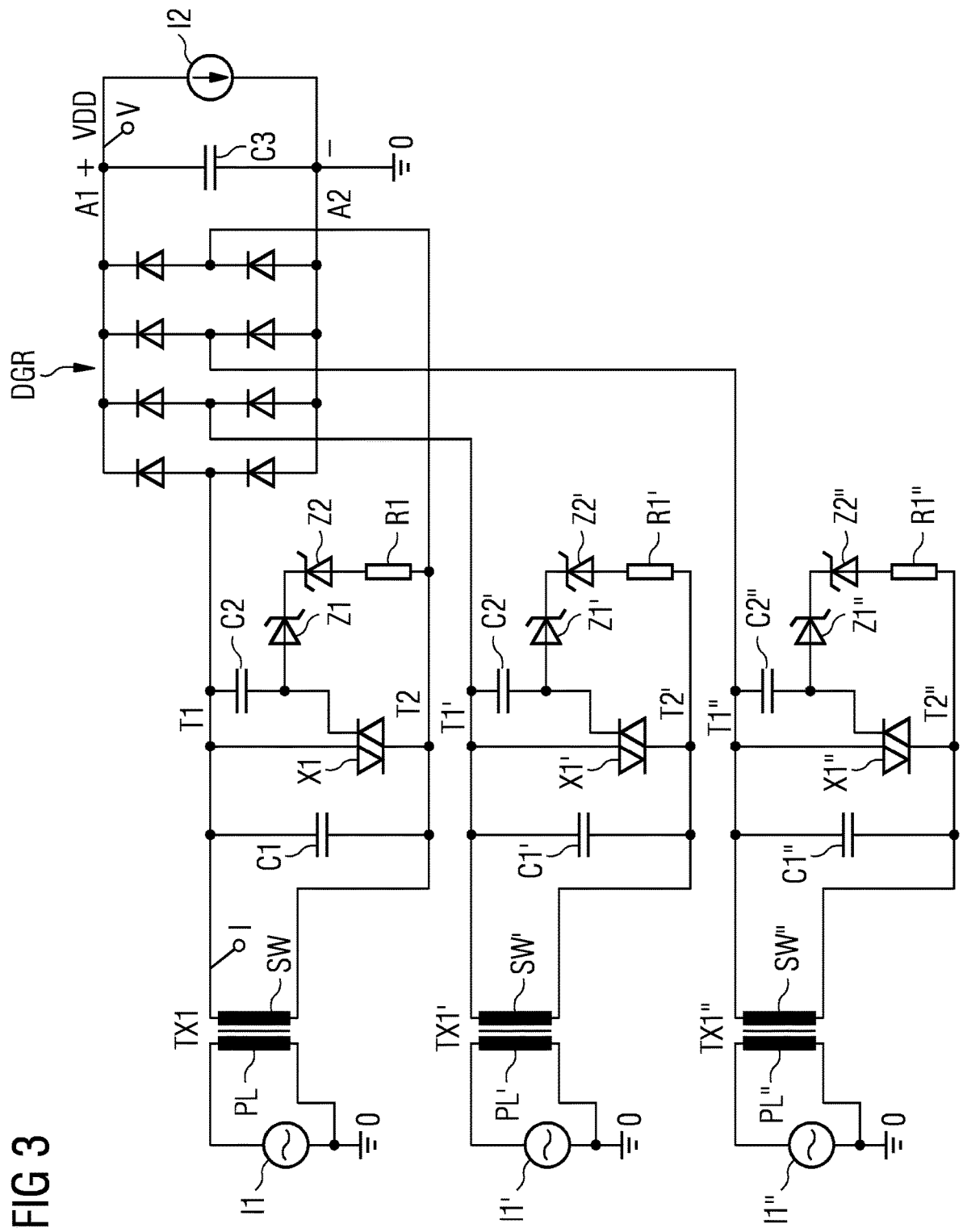
FIG. 3 shows a second circuit according to an embodiment of the invention of an energy supply.

FIG. 3 shows a circuit according to FIG. 1 with the difference that three current converters TX1, TX1', TX1" are provided, The current converters each being associated with one phase of a three-phase AC circuit. That is to say, the primary conductor PL, PL', PL" of the respective current converter TX1, TX1', TX1" is associated with one phase. The secondary windings SW, SW', SW" are each connected to a circuit according to an embodiment of the invention in line with FIG. 1. Furthermore, the rectifier GR is replaced by a three-phase rectifier DGR. By way of example, The three-phase rectifier has a three-phase bridge circuit, as illustrated in FIG. 3. The outputs A1, A2 of the three-phase rectifier DGR are in turn connected to one another via the third capacitor C3. A load 12, such as the electronic trip unit of a circuit breaker, can in turn be connected in parallel with the third capacitor C3 in order to provide the energy supply for an electrical circuit breaker.

In the series circuit comprising the zener diodes Z1, Z2, the cathodes of the two zener diodes are connected to one another in FIG. 3.

Figure 4:
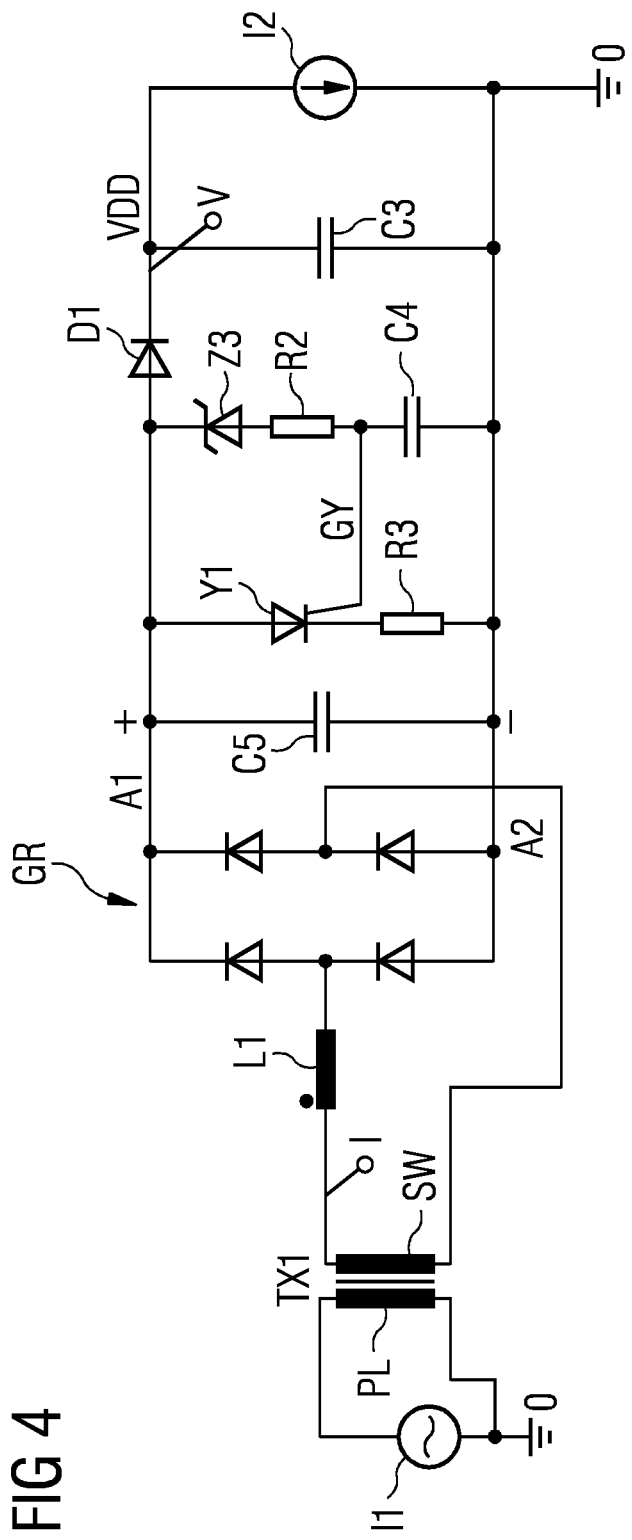
FIG. 4 shows a third circuit according to an embodiment of the invention of an energy supply with a DC voltage current limiting device.

FIG. 4 shows a circuit of an energy supply for a circuit breaker with DC voltage current limiting device.

Identical components according to FIG. 1 have the same reference symbols in FIG. 4.

A current converter TX1 has, on the primary side, a primary conductor PL which is part of an electrical circuit which is monitored by a circuit breaker, not illustrated, and has an energy source I1. The current converter TX1 has, on the secondary side, a secondary winding SW which can have two or more connections.

A rectifier GR is connected to two connections of the secondary winding SW. The rectifier can be formed, for example, by a bridge circuit or Graetz circuit, as illustrated in FIG. 4.

An inductor L1 can be connected between the secondary winding SW and the rectifier GR, for example between a connection of the secondary winding SW and an input of the rectifier GR, as illustrated in FIG. 4.

Analogously, a second inductor or resistor, not illustrated, can for example be connected between the other connection of the secondary winding and the other connection of the rectifier.

In principle, further electrical components, such as resistors, capacitors, inductors, diodes, transistors, thyristors, triacs etc., can also be provided in or on the electrical circuit in the case of The circuits, such as parallel or series circuits, here.

The positive output A1 or positive pole and the negative output A2 or negative pole of the rectifier GR can be connected to one another via a fifth capacitor C5, as illustrated in FIG. 4. An improved EMC response can be realized in this way.

The anode of a thyristor Y1 is connected to the positive output A1 or positive pole of the rectifier or a DC voltage conductor pair and the cathode is connected to the negative output A2 or negative pole of the rectifier or a DC voltage conductor pair for the energy supply of the circuit breaker.

This path can have a third resistor R3 with which, for example, the current through the thyristor Y1 can be measured.

The cathode of a zener diode Z3 is connected to the positive output A1 or positive pole, the anode of The zener diode being connected to the gate GY of the thyristor Y1.

The zener diode 33 can be connected in series with a second resistor R2. Current limiting or adjustment of a triggering current of the thyristor can be realized in this way.

A fourth capacitor C4 can be connected between the gate connection GY of the thyristor Y1 and the negative pole or second output A2 of the rectifier. An improved EMC response can be realized and high-frequency components can be suppressed by The capacitor.

A series circuit comprising a first diode D1 and the third capacitor C3 is connected between the positive pole and the negative pole. The anode of the first diode D1 is connected to the positive pole or the cathode of the first diode D1 is connected to the negative pole. The energy supply of a load 12, like that of the circuit breaker, is in turn provided by the voltage across the third capacitor C3.

Figure 5:
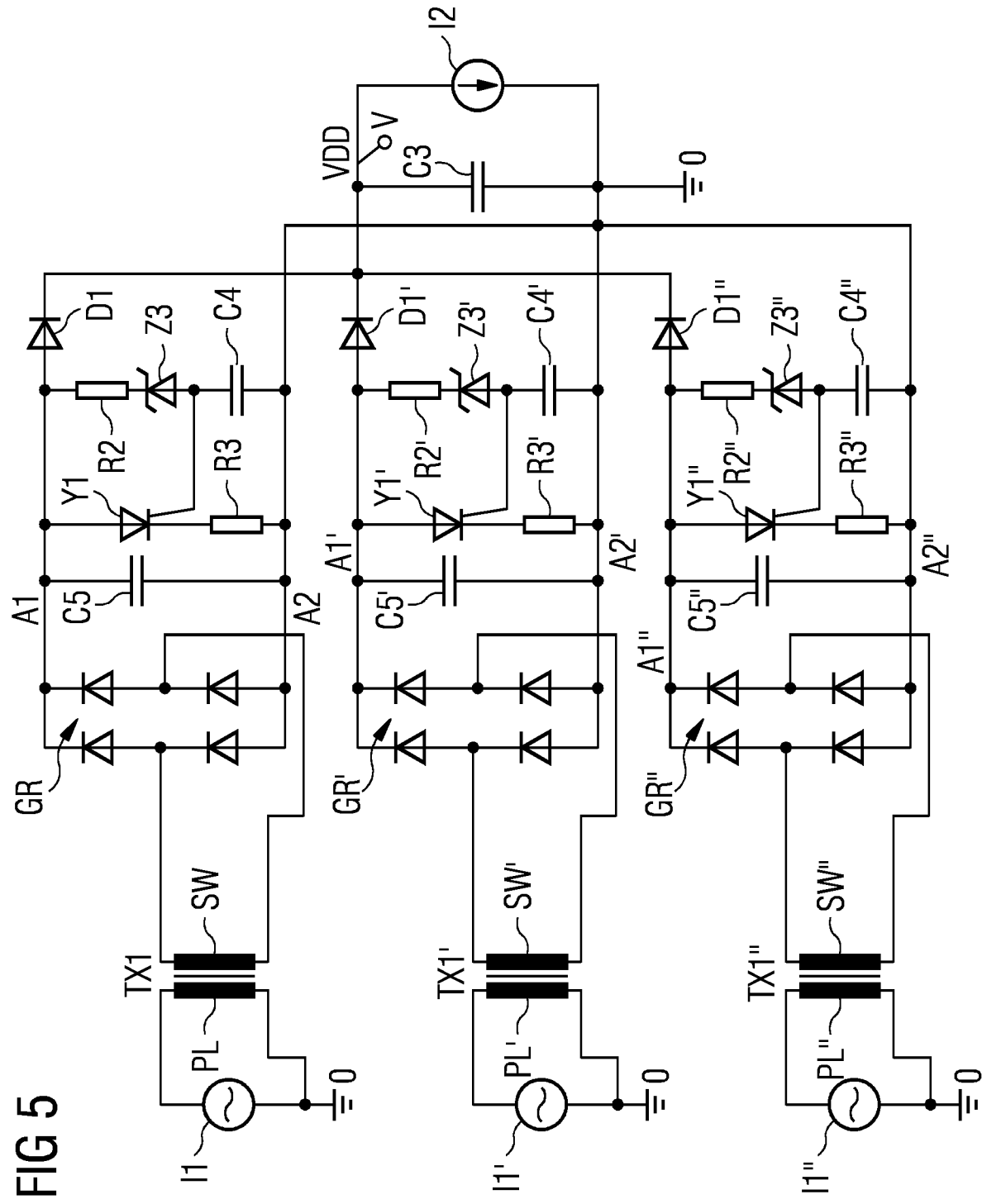
FIG. 5 shows a fourth circuit according to an embodiment of the invention of an energy supply with a DC voltage current limiting device.

FIG. 5 shows a circuit according to FIG. 4, with the difference that three current converters TX1, TX1', TX1" are provided, The current converters each being associated with one phase of a three-phase AC circuit. That is to say, the primary conductor PL, PL', PL" of the respective current converter TX1, TX1', TX1" is associated with one phase. The secondary windings SW, SW', SW" are each connected to a circuit according to the invention in line with FIG. 4.

The series circuit comprising the first diode D1 and the third capacitor C3 has been replaced by a circuit in which the cathodes of the first diode D1, D1', D1" of the respective phase-related circuits are connected to one another, The connecting point in turn being connected to a connection of the third capacitor C3, the other connection of which is connected to the interconnection of the negative poles or second outputs A2, A2', A2".

Analogously, the positive poles could also be connected to one another and the anodes of the diodes are connected to one another and to the third capacitor C3.

In turn, a load 12, such as the electronic trip unit of a circuit breaker, can be connected in parallel with the third capacitor C3 in order to provide the energy supply for a load/electrical circuit breaker.

The components, such as resistors, capacitors, inductors etc., can also be realized in the form of several components, such as by further parallel/series circuits of components for example.

The invention and, respectively, example embodiments will be explained once again in the text which follows. The invention is based on the principle of limiting the secondary power by short-circuiting the secondary current.

In FIG. 1, a bidirectional thyristor or triac X1 is used as an electronic bypass. The thyristor or triac has the property that it blocks current flow between its two main connections T1, T2 when voltage is applied. This state is ended by a short current pulse at the control connection of at most 10 mA. The triac X1 triggers and allows the current to flow between the main connections T1, T2. The voltage between the main connections T1, T2 drops to approximately 0.5 to 1.5 V.

The current flow ends periodically due to a change in the polarity in the AC circuit and the triac X1 turns off again as soon as the current flow falls below the holding current of the triac or thyristor. The triac X1 is arranged in parallel with the secondary winding SW. The blocking property of the triac X1 allows the current flow across the rectifier GR into the third or charging capacitor C3 and therefore to the load or the electronics system. The third capacitor C3 is charged over the course of time. The induced voltage across the secondary winding SW also increases in parallel with the increasing voltage across the third capacitor C3.

A series comprising two reverse-biased zener diodes Z1, Z2 isolates the control input G1 of the triac X1 from the secondary winding SW.

As soon as the applied voltage between the secondary winding SW and the control input G1 exceeds the zener voltage of a zener diode Z1, Z2, current flows across the control input G1 and the triac X1 triggers.

The first resistor R1, in series with the zener diodes, limits the triggering current level.

In the triggered state, the triac X1 becomes a low-resistance component and limits the applied secondary voltage to a residual voltage.

In parallel thereto, the current flow in the control input G1 is again interrupted by the zener diodes Z1, Z2. The secondary current flow is short-circuited by the triac X1 for the rest of the period. The load or the electronics system is supplied by the energy stored in the third capacitor C3 over this time period. As a result, the third capacitor C3 is discharged. With the next change in polarity in the supply system, the triac X1 turns off and charging of the third capacitor C3 begins anew. On account of the coupling of the current interruption via the triac X1, the circuit always operates synchronously with the supply system. Small capacitors in parallel with the triac or thyristor connections stabilize the triggering process and reduce EMC interference.

FIG. 2 shows the switch-on behavior until stabilization of the voltage across the third capacitor C3 or buffer capacitor. As soon as a current flows through the primary conductor, a power is output on the secondary side of the current converter SW. In this example, the third capacitor C3 is charged to the desired voltage within the first four periods. It can be seen that the secondary current repeatedly drops starting from the second period. This is a normal response of the current converters which is caused by the capacitive load and the associated situation of magnetic saturation in the current converter being reached. Starting from the fifth period, the voltage across the third capacitor or buffer capacitor C3 is high enough that the triac X1 can be triggered at the control input via the zener diodes Z1, Z2. From this point on, the third or buffer capacitor C3 is recharged with each change in polarity in the supply system. The secondary current is short-circuited by the triac X1 starting from the triggering time. The sinusoidal profile of the secondary current over the entire period shows that the current converter operates within the linear range, that is to say magnetic saturation effects remain limited to the initial charging phase.

In FIG. 3, three circuits according to FIG. 1 are combined in order to ensure the supply of a load or the electronics system from a three-phase supply system. Each current converter has its own electronic bypass. A connection of the current converters forms a star point. The star point and all of the current converters are coupled to a common buffer capacitor via a three-phase rectifier, The buffer capacitor in turn supplying the connected electronics system. The electronic bypass circuits can be arranged close to the current converters and in this way prevent the loads or electronics system being exposed to high secondary powers.

FIG. 4 shows an alternative solution with a (unidirectional) thyristor. A dedicated rectifier is provided on each current converter TX1, TX1', TX1". A thyristor Y1 is arranged between the positive and the negative connection of the rectifier A1, A2. The triggering circuit to the gate GY of the thyristor comprises a third zener diode Z3 and selectively the second series resistor R2.

Discharging of the third or buffer capacitor C3 via the thyristor Y1 is prevented by a first diode or blocking diode D1 between the electronic bypass and the third capacitor C3.

A measuring resistor R3 can advantageously be inserted between the negative pole and the thyristor cathode Y1. The voltage drop across the third resistor or measuring resistor R3 can be supplied as a phase-dependent current measuring signal to an evaluation electronics system which monitors the current flow and implements a protection function of the circuit breaker. The linearity of the current converters up to a high primary current range is required for this application. Current converters with current-limiting properties are undesirable here. Thyristors are very robust power semiconductors which briefly withstand a multiple of the continuous current capacity. Therefore, The thyristors are particularly suitable for the circuit described here.

In the three-phase case according to FIG. 5, an electronic bypass comprising a rectifier GR, GR', GR", such as a bridge rectifier, and a thyristor Y1, Y1', Y1" are provided for each phase, wherein the negative potentials of all of the rectifiers form the common ground of the load or of the electronics system and the connection points downstream of the blocking diodes to the third capacitor or common buffer capacitor C3 are combined upstream of the load or the electronics system. Since each electronic bypass implements, for example, a dedicated third measuring resistor R3, R3', R3", the currents of all of the phases can be separately tracked and monitored.

Although the invention has been more specifically illustrated and described in detail by the example embodiment, the invention is not restricted by the disclosed examples, and other variations can be derived therefrom by a person skilled in the art without departing from the scope of protection of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An energy supply for an electrical circuit breaker, comprising:
   a current converter including a primary conductor and a secondary winding;
   a triac including two main connections and one control connection, the triac being connected electrically in parallel with the secondary winding via the main connections, the two main connections of the triac being connected to input connections of a rectifier and two DC voltage-side output connections of the rectifier being connected to a capacitor; and
   a series circuit comprising at least two zener diodes, the series circuit being connected to the control connection of the triac at one end of the series circuit and being connected to a main connection of the triac at another end of the series circuit;
   wherein the electrical circuit breaker is designed for a three-phase energy supply system, one current converter and one triac being provided for each phase of the three-phase energy supply system, the rectifier being configured as a three-phase rectifier, and the two main connections of the triac, of each phase of the three-phase energy supply system, each being connected to a respective input of the three-phase rectifier.

2. The energy supply of claim 1, wherein the primary conductor is a conductor of the electrical circuit breaker, current flow of the conductor through the electrical circuit breaker being monitorable such that, in response to current limit values or current/time period limit values being exceeded, and the primary conductor of the electrical circuit breaker being configured to be interrupted.

3. The energy supply of claim 2, wherein a another capacitor is connected in parallel with the two main connections of the triac.

4. The energy supply of claim 1, wherein another capacitor is connected in parallel with the two main connections of the triac to form a parallel circuit.

5. The energy supply of claim 4, wherein the parallel circuit comprises the secondary winding and the triac includes a first inductor.

6. The energy supply of claim 1, wherein the series circuit comprising at least two zener diodes includes a first resistor.

7. The energy supply of claim 1, wherein a control connection-side connection of the series circuit is connected to another capacitor which, at another end, is connected to a main connection of the triac, of the two main connections of the triac, that is not connected to the series circuit.

8. The energy supply of claim 1, wherein the two DC voltage-side output connections of the rectifier provide an energy supply for the electrical circuit breaker.

9. A DC voltage current limiting device for an electrical circuit breaker, comprising:
   a thyristor, an anode of the thyristor being connected to a positive pole of a DC voltage conductor pair and a cathode of the thyristor being connected to a negative pole of the DC voltage conductor pair, for energy supply of the electrical circuit breaker; and
   a zener diode, a cathode of the zener diode being connected to the positive pole of the DC voltage conductor pair and an anode of the zener diode being connected to a gate of the thyristor,
   wherein the electrical circuit breaker is designed for a three-phase energy supply system, one current converter and one triac being provided for each phase of the three-phase energy supply system, a rectifier being configured as a three-phase rectifier, two main connections of the triac being connected to input connections of a rectifier and two DC voltage-side output connections of the rectifier being connected to a capacitor, and the two main connections of the triac, of each phase of the three-phase energy supply system, each being connected to a respective input of the three-phase rectifier.

10. The DC voltage current limiting device of claim 9, wherein a second resistor is connected in series with the zener diode.

11. The DC voltage current limiting device of claim 10 wherein a capacitor is connected between a gate connection of the thyristor and the negative pole of the DC voltage conductor pair.

12. The DC voltage current limiting device of claim 10, wherein a capacitor is connected to a cathode-side connection of the thyristor at one end of the capacitor and to an anode-side connection of the thyristor at another end of the capacitor.

13. The DC voltage current limiting device of claim 10, wherein the DC voltage conductor pair is connected to an output of a rectifier, the rectifier being connected, at an input end of the rectifier, to a secondary winding of a current converter of the electrical circuit breaker.

14. The DC voltage current limiting device of claim 9 wherein a capacitor is connected between a gate connection of the thyristor and the negative pole.

15. The DC voltage current limiting device of claim 9, wherein a capacitor is connected to a cathode-side connection of the thyristor at one end and to an anode-side connection of the thyristor at another end.

16. The DC voltage current limiting device of claim 9, wherein a series circuit comprising a diode and a capacitor is electrically connected between the positive pole of the DC voltage conductor pair and the negative pole of the DC voltage conductor pair, and wherein the anode of the diode is connected to the positive pole of the DC voltage conductor pair or the cathode of the diode is connected to the negative pole of the DC voltage conductor pair, and energy supply of the electrical circuit breaker is provided by the DC voltage across the capacitor.

17. The DC voltage current limiting device of claim 9, wherein the DC voltage conductor pair is connected to an output of a rectifier, the rectifier being connected, at an input end of the rectifier, to a secondary winding of a current converter of the electrical circuit breaker.

* * * * *